(12) United States Patent
Tozawa et al.

(10) Patent No.: US 8,870,550 B2
(45) Date of Patent: Oct. 28, 2014

(54) MOTOR-DRIVEN COMPRESSOR

(75) Inventors: Kosaku Tozawa, Kariya (JP); Shinji Tsubai, Kariya (JP); Ken Suitou, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 368 days.

(21) Appl. No.: 13/070,791

(22) Filed: Mar. 24, 2011

(65) Prior Publication Data

US 2011/0243767 A1    Oct. 6, 2011

(30) Foreign Application Priority Data

Mar. 31, 2010    (JP) ................................ 2010-082904

(51) Int. Cl.
    F04B 39/12    (2006.01)
    B60H 1/00     (2006.01)
    F04B 35/04    (2006.01)

(52) U.S. Cl.
    CPC .......... *F04B 39/121* (2013.01); *B60H 1/00521* (2013.01); *F04B 35/04* (2013.01); *F05C 2225/00* (2013.01)
    USPC ......................................... 417/360; 267/293

(58) Field of Classification Search
    CPC .................................................... F04B 39/127
    USPC ........... 417/360, 361, 363, 572; 248/65, 74.1, 248/74.2, 74.3, 635, 638; 439/345; 267/293
    See application file for complete search history.

(56) References Cited

U.S. PATENT DOCUMENTS

| 2,751,147 | A | * | 6/1956 | Wurtz ............................ 417/363 |
| 4,600,367 | A | * | 7/1986 | Terauchi et al. .............. 417/360 |
| 4,766,968 | A | * | 8/1988 | Matsunaga ................... 180/68.4 |
| 4,834,336 | A | * | 5/1989 | Shimazaki et al. ............ 248/666 |
| 4,938,448 | A | * | 7/1990 | Shimazaki .................... 248/635 |
| 4,988,071 | A | * | 1/1991 | Shimazaki et al. ............ 248/666 |

(Continued)

FOREIGN PATENT DOCUMENTS

| CN | 1045450 A  | 9/1990 |
| CN | 1573094 A  | 2/2005 |

(Continued)

OTHER PUBLICATIONS

Chinese Office Action with English Translation for Chinese patent Application No. 201110078362.9 mailed on Jul. 1, 2013.

(Continued)

*Primary Examiner* — Charles Freay
*Assistant Examiner* — Philip Stimpert
(74) *Attorney, Agent, or Firm* — Yoshida & Associates, LLC

(57) ABSTRACT

A motor-driven compressor is to be mounted to a first mounting of a vehicle. The compressor includes a compressor body that is electrically powered to draw in fluid for compression and to discharge the compressed fluid, and a second mounting for securing the compressor body to the first mounting. The second mounting includes a first mounting member having a first mounting hole, a second mounting member provided away from the first mounting member and having a second mounting hole, a resin member integrally formed with the first and second mounting members and provided at least between the first mounting member and the compressor body, a first fastening member inserted through the first mounting hole for securing the first mounting member to the first mounting, and a second fastening member inserted through the second mounting hole for securing the second mounting member to the compressor body.

7 Claims, 7 Drawing Sheets

(56) References Cited

U.S. PATENT DOCUMENTS

| | | | |
|---|---|---|---|
| 4,993,682 A * | 2/1991 | Imai et al. | 248/638 |
| 5,052,903 A | 10/1991 | Takahashi | |
| 6,027,322 A | 2/2000 | Ferentinos et al. | |
| 6,029,942 A | 2/2000 | Daddis, Jr. et al. | |
| 6,233,140 B1 * | 5/2001 | Cummings et al. | 361/679.55 |
| 6,460,823 B1 * | 10/2002 | Herder et al. | 248/637 |
| 6,669,452 B2 * | 12/2003 | Ogawa et al. | 417/360 |
| 6,705,581 B2 * | 3/2004 | Trago et al. | 248/656 |
| 7,788,804 B2 | 9/2010 | Kim | |
| 2001/0032764 A1 * | 10/2001 | Hasegawa et al. | 188/378 |
| 2002/0100855 A1 * | 8/2002 | Zupan et al. | 248/674 |
| 2002/0131878 A1 * | 9/2002 | Ogawa et al. | 417/360 |
| 2005/0178604 A1 * | 8/2005 | Burnham | 180/312 |
| 2010/0224664 A1 * | 9/2010 | Hishinuma et al. | 224/555 |
| 2011/0243763 A1 * | 10/2011 | Suitou et al. | 417/363 |
| 2011/0243764 A1 * | 10/2011 | Tsubai et al. | 417/363 |
| 2011/0243765 A1 * | 10/2011 | Sugiyama et al. | 417/363 |
| 2012/0076680 A1 * | 3/2012 | Bahmata et al. | 417/572 |
| 2012/0214328 A1 * | 8/2012 | Downing | 439/345 |
| 2012/0251350 A1 * | 10/2012 | Suitou et al. | 417/363 |
| 2012/0251357 A1 * | 10/2012 | Yokoi et al. | 417/410.1 |

FOREIGN PATENT DOCUMENTS

| | | |
|---|---|---|
| DE | 19914655 A1 | 10/2000 |
| DE | 10351372 A1 | 6/2005 |
| EP | 1138894 A | 10/2001 |
| JP | 63-65873 U | 4/1988 |
| JP | 63-88520 U | 6/1988 |
| JP | 64-44810 U | 3/1989 |
| JP | 64-44812 U | 3/1989 |
| JP | 64-44813 U | 3/1989 |
| JP | 64-44815 U | 3/1989 |
| JP | 3-273926 A | 12/1991 |
| JP | 2000-130330 A | 5/2000 |
| JP | 2003-74635 A | 3/2003 |
| JP | 2004-162671 A | 6/2004 |
| JP | 2005-220854 A | 8/2005 |
| JP | 2005-220855 A | 8/2005 |
| JP | 2005-220856 A | 8/2005 |

OTHER PUBLICATIONS

German Office Action with English Translation for German Patent Application No. 10 2011 015 417. 5 mailed on Oct. 2, 2013.
Japanese Office Action with English Translation for Japanese Patent Application No. 2010-82904 mailed on Apr. 16, 2013.

* cited by examiner

MOTOR-DRIVEN COMPRESSOR

BACKGROUND OF THE INVENTION

The present invention relates to a motor-driven compressor, and more particularly to a motor-driven compressor to be mounted on a vehicle.

Hybrid vehicle that is powered by both engine and electric motor varies the ratio of engine drive to motor drive in accordance with its running condition. In such hybrid vehicle, if a compressor that operates a refrigeration cycle of an air conditioner is driven by the engine of the vehicle, the compressor cannot obtain necessary drive force constantly from the engine. In a hybrid vehicle, therefore, a compressor that is driven by electric power from a battery mounted on the vehicle is used. Such motor-driven compressor is mounted on the body or engine of the vehicle.

The compressor is driven only by the electric motor when the engine is at a stop, such as during an idle stop. When the compressor is driven with the engine at a stop, noise is developed due to the operation of the compressor. Main cause of the noise development is the resonance due to the vibration of the body or engine caused by the vibration of the compressor transmitted via its mounting rather than the sound radiated from the compressor. Various mountings for a motor-driven compressor has been proposed to reduce the vibration transmission from the compressor to the body or engine of the vehicle.

Japanese Unexamined Utility Model Application Publication No. 64-44810 discloses a compressor having cylindrical fittings fixed thereto and used for mounting the compressor to an engine block. Tightening the bolts inserted through the cylindrical fittings into the threaded hole of the engine block, the compressor is mounted to the engine block. A rubber cushion is wrapped around the cylindrical fitting. The cylindrical fitting thus having the rubber cushion wrapped therearound is mounted to the compressor by using a bracket having a curled portion holding therein the cylindrical fitting and screwed to the outer surface of the compressor. The rubber cushion is provided between the bracket and the cylindrical fitting and between the compressor and the cylindrical fitting.

In the compressor disclosed in the publication No. 64-44810 wherein the cylindrical fitting provided on the compressor is held by the bracket screwed to the compressor, however, the cylindrical fitting is not mounted firmly to the compressor because of the rubber cushion provided between the bracket and the cylindrical fitting and the cylindrical fitting and the compressor. This causes displacement of the compressor during operation, so that the compressor vibrates with a large amplitude. The displacement of the compressor may damage the connection between the compressor and the refrigeration circuit. The large-amplitude vibration of the compressor may be transmitted to a vehicle and, therefore, passengers of the vehicle may be subjected to undesired vibration and noise.

The present invention is directed to providing a motor-driven compressor that allows reduction of noise in a vehicle and provides a rigid mounting for the compressor.

SUMMARY OF THE INVENTION

In accordance with an aspect of the present invention, a motor-driven compressor is to be mounted to a first mounting of a vehicle. The compressor includes a compressor body that is electrically powered to draw in fluid for compression and to discharge the compressed fluid, and a second mounting for securing the compressor body to the first mounting. The second mounting includes a first mounting member having a first mounting hole, a second mounting member provided away from the first mounting member and having a second mounting hole, a resin member integrally formed with the first and second mounting members and provided at least between the first mounting member and the compressor body, a first fastening member inserted through the first mounting hole for securing the first mounting member to the first mounting, and a second fastening member inserted through the second mounting hole for securing the second mounting member to the compressor body.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe the embodiments of the motor-driven compressor according to the present invention with reference to the attached drawings. In the embodiments, the compressor is intended to be mounted to an internal combustion engine of a vehicle.

Figure 1:
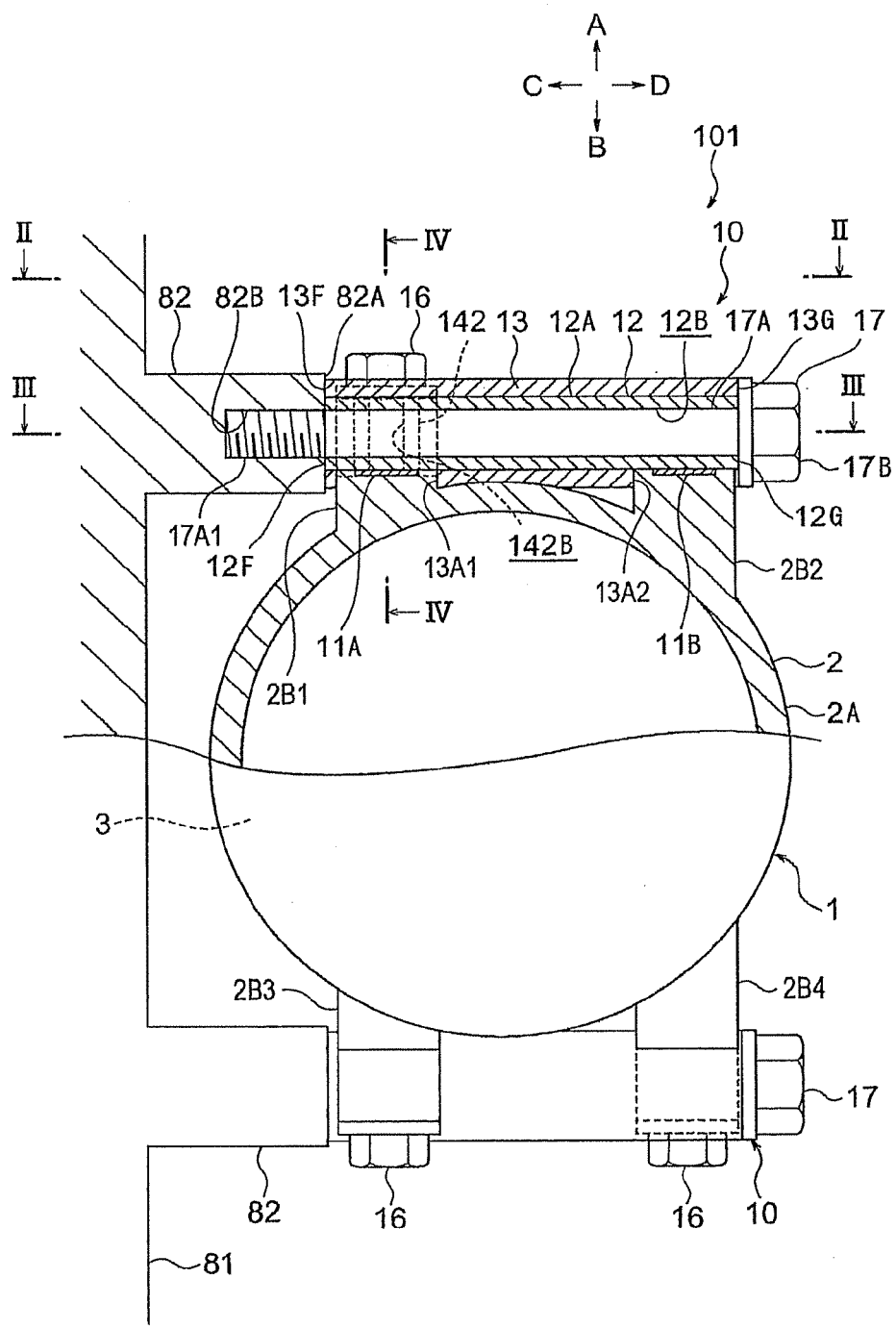
FIG. 1 is a schematic partially cut-away cross-sectional view of a motor-driven compressor according to a first embodiment of the present invention, showing a housing and mountings of the compressor.

Referring to FIG. 1, the motor-driven compressor designated generally by 101 includes a compressor body 1 and plural mountings 10 (second mounting) fixed to the compressor body 1. It is noted that the upper side of the compressor 101 is indicated by arrow A in the drawings, and the lower side, the left side, the right side, the front side and the rear side by arrows B, C, D, E and F, respectively. The compressor body 1 has a cylindrical housing 2 receiving therein a compression mechanism 3 that is electrically powered for compressing fluid such as refrigerant introduced into the housing 2 and discharging the compressed fluid out of the housing 2. The housing 2 is made of a metal such as aluminum alloy.

Figure 2:
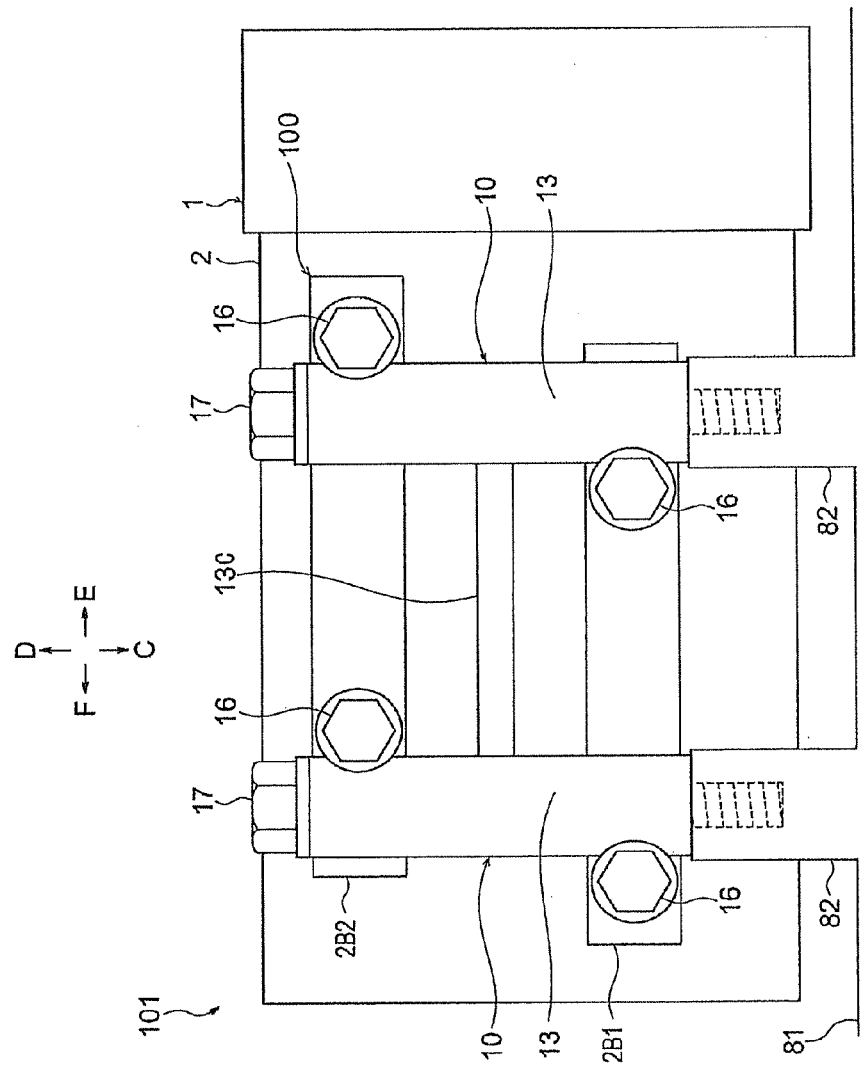
FIG. 2 is a plan view as seen in the direction of arrow 11 of FIG. 1.

The housing 2 has on the upper side thereof two mounting bases 2B1 and 2B2 and on the lower side thereof two mounting bases 2B3 and 2B4. The mounting bases 2B1, 2B2, 2B3 and 2B4 are formed integrally with the housing 2, projecting from the outer peripheral surface 2A of the housing 2. Referring to FIG. 2, the mountings 10 are located across the mounting bases 2B1 and 2B2 and secured thereto by fasteners 16 such as a screw. Each mounting 10 is of a generally cylindrical shape, the longitudinal axis of which is perpendicular to the longitudinal axis of the housing 2. In the present embodiment, the compressor 101 has four mountings 10, two of which are mounted to the mounting bases 2B1 and 2B2, and the other two of which (only one being shown in FIG. 1) are mounted to the mounting bases 2B3 and 2B4.

As shown in FIG. 1, the mounting 10 includes a first cylindrical member 12 (first mounting member) having a mounting hole 12B (first mounting hole) extending axially therethrough. The first cylindrical member 12 is made of a metal and electrically conductive.

The mounting 10 includes a resin member 13 formed so as to surround part of the outer peripheral surface 12A of the first cylindrical member 12, as shown in FIG. 1. Specifically, the resin member 13 is cut away at positions corresponding to the mounting bases 2B1 and 2B2 of the housing 2 so that cuts 13A1 and 13A2 are formed where the first cylindrical member 12 faces the mounting bases 2B1 and 2B2. The resin member 13 is formed on the first cylindrical member 12 so that the longitudinal ends 13F and 13G do not extend beyond the longitudinal ends 12F and 12G of the cylindrical member 12, respectively.

Figure 3:
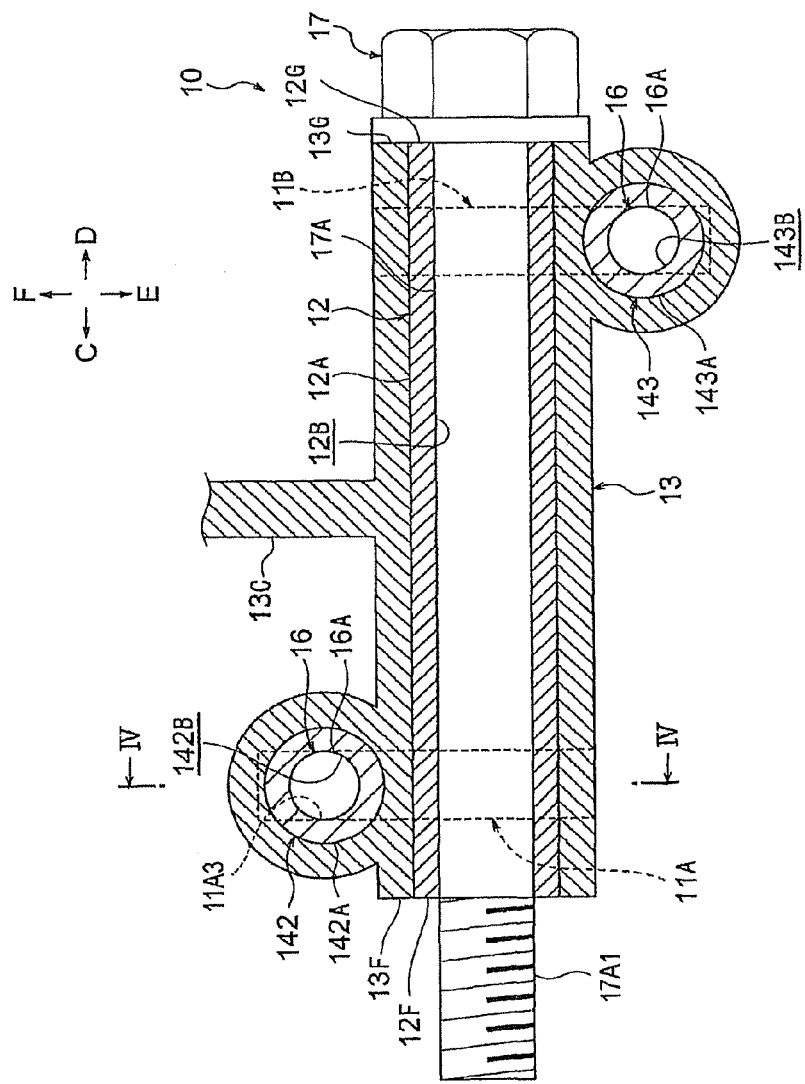
FIG. 3 is a cross-sectional view taken along the line III-III of FIG. 1.

Referring to FIG. 3, the mounting 10 further includes a second cylindrical member 142 and a third cylindrical member 143, both of which are made of a metal and located away from the first cylindrical member 12. The second cylindrical member 142 is located rearward of the first cylindrical member 12, and the third cylindrical member 143 is located forward of the first cylindrical member 12. The second and third cylindrical members 142 and 143 are disposed with the longitudinal axes thereof extending perpendicular to the longitudinal axis of the first cylindrical member 12. The second and third cylindrical members 142 and 143 (second mounting member) have mounting holes 142B and 143B (second mounting hole) extending axially therethrough, respectively.

Figure 4:
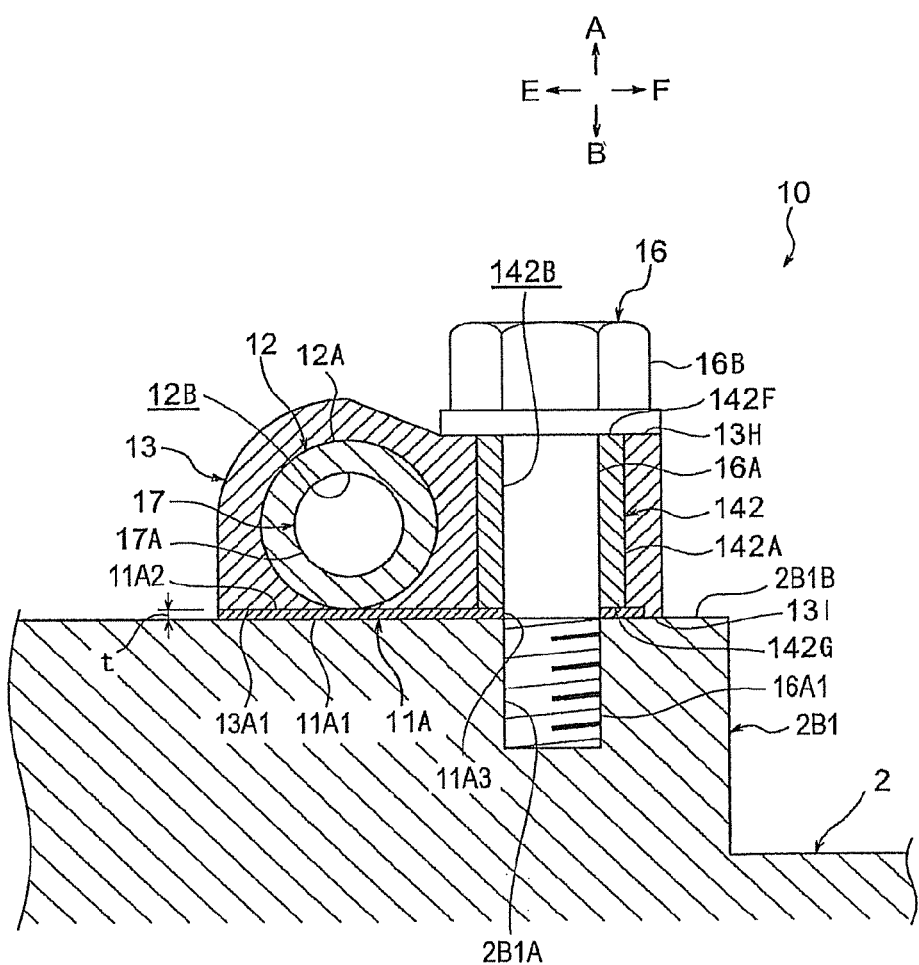
FIG. 4 is a cross-sectional view taken along the line IV-IV of FIGS. 1 and 3.

The resin member 13 is formed also around the outer peripheral surfaces 142A and 143A of the second and third cylindrical members 142 and 143. Referring to FIG. 4, part of the resin member 13 that is adjacent to the second cylindrical member 142 is formed so that the upper and lower ends 13H and 13I of the resin member 13 adjacent to the second cylindrical member 142 do not extend beyond the upper and lower ends 142F and 142G of the second cylindrical member 142, respectively. Part of the resin member 13 that is adjacent to the third cylindrical member 143 is formed in the same way. Referring back to FIG. 3, the mounting 10 is formed by the first cylindrical member 12, the second cylindrical member 142, the third cylindrical member 143 and the resin member 13 which are connected together. The resin member 13 provided between the first cylindrical member 12 and the second cylindrical member 142 and also between the first cylindrical member 12 and the third cylindrical member 143 keeps the first cylindrical member 12 from being brought into direct contact with the second and third cylindrical members 142 and 143.

The resin member 13 has a connection 13C formed integrally therewith by which two mountings 10 are connected together thereby to form a mounting assembly 100 (see FIG. 2). The resin member 13 is formed integrally with two sets of cylindrical members, each including the first, second and third cylindrical members 12, 142 and 143, for example, by insert molding.

The resin member 13 is made of a material with high adhesion to metal, high rigidity, and high vibration damping property. The material for the resin member 13 has a bending elastic modulus of not less than 100 MPa and not more than 10000 MPa. The material for the resin member 13 includes PP (polypropylene), PBT (polybutylene terephthalate), PVC (polyvinyl chloride), PUR (polyurethane), PTFE (polytetrafluoroethylene), PF (phenol formaldehyde), PC (polycarbonate), PA (polyamide, nylon), ABS (acrylonitrile butadiene styrene), carbon plastic, or composite of such materials. The resin member 13 may be made of any fiber-reinforced plastic (FRP).

The loss factor of the material for the resin member 13, which is associated with vibration damping property, is higher than that of the material for the housing 2 and the first, second and third cylindrical members 12, 142 and 143, preferably ranging from 0.01 to 1. For example, aluminum alloy as a material for the housing 2 and the cylindrical member 12 has a loss factor of about 0.0001.

As shown in FIG. 4, the mounting 10 further includes a metal film 11A or metal foil (flexible conductive member) provided in the cut 13A1 of the resin member 13 and coupled at the upper surface 11A2 thereof to the bottom of the outer peripheral surface 12A of the first cylindrical member 12. The metal film 11A is electrically conductive and has a thickness t preferably ranging from about 0.1 to about 0.5 mm so as to be low in rigidity. The metal film 11A is extended to the lower end 142G of the second cylindrical member 142 to be in contact therewith at the upper surface 11A2 of the metal film 11A. The metal film 11A has a hole 11A3 formed therethrough and communicating with the mounting hole 142B of the second cylindrical member 142 (see FIG. 3).

The metal film 11A is integrated with the first and second cylindrical members 12 and 142 by the resin member 13. The lower surface 11A1 of the metal film 11A is exposed on the resin member 13 when the mounting 10 is yet to be fixed to the compressor body 1. The resin member 13 fills between the metal film 11A and the first cylindrical member 12 and also between the first and second cylindrical members 12 and 142. The mounting 10 further includes a metal film 11B (flexible conductive member) provided in the cut 13A2 of the resin member 13 in the same manner as the metal film 11A (see FIGS. 1 and 3). As shown in FIG. 4, the housing 2 has an internally threaded hole 2B1A formed in the end surface 2B1B of the mounting base 2B1.

In securing the mounting 10 to the mounting base 2B1 of the housing 2, firstly, the lower surface 11A1 of the metal film 11A is set in contact with the end surface 2B1B of the mounting base 2B1. Next, the fastener 16 (second fastening member) such as screw having a shaft 16A formed with an external thread 16A1 is inserted into the mounting hole 142B of the second cylindrical member 142. The shaft 16A of the fastener 16 is further inserted through and the hole 11A3 of the metal film 11A and screwed into the threaded hole 2B1A of the mounting base 2B1. Tightening the fastener 16, the second cylindrical member 142 and the metal film 11A are tightened to the mounting base 2B1, so that the first cylindrical member 12 and the resin member 13 which are integrated with the second cylindrical member 142 are secured to the mounting base 2B1. The fastener 16 is made of a metal.

With the mounting 10 thus secured to the mounting base 2B1 of the housing 2, the metal film 11A electrically connects the first cylindrical member 12 and the housing 2. The metal film 11A is interposed between the first cylindrical member 12 and the mounting base 2B1, so that the first cylindrical member 12 is not pressed directly against the mounting base 2B1. The metal film 11A keeps the first cylindrical member 12 from being in direct contact with the mounting base 2B1. Specifically, the metal film 11A keeps the first cylindrical member 12 away from the mounting base 2B1 at a spaced distance t that is the thickness of the metal film 11A. The upper end 142F of the second cylindrical member 142 is in contact with the head 16B of the fastener 16, and the lower end 142G of the second cylindrical member 142 is in contact with the metal film 11A that is placed on the end surface 2B1B of the mounting base 2B1. The compressive force due to tightening of the fastener 16 is supported by the second cylindrical member 142 that has higher compressive strength than the resin member 13, so that the resin member 13 is subjected to no such compressive force, which reduces fatigue and creep occurring in the resin member 13.

Fixing the mounting 10 to the mounting base 2B2 of the housing 2 is accomplished by fastening the third cylindrical member 143 to the mounting base 2B2 using the fastener 16 as in the case of the second cylindrical member 142. Fastening the second and third cylindrical members 142 and 143 of the mounting 10 to the mounting bases 2B1 and 2B2 using the fasteners 16, the mounting 10 is fixed to the housing 2 of the compressor body 1. The mounting assembly 100 including two mountings 10 connected together by the connection 13C is mounted to the housing 2 by fastening the respective mountings 10 to the mounting bases 2B1 and 2B2.

As shown in FIG. 1, an engine 81, to which the compressor 101 is mounted, has cylindrical mountings 82 (first mounting). The mounting 82 has in the end surface 82A thereof an internally threaded hole 82B.

In mounting the compressor 101 to the engine 81, the mountings 10 of the compressor 101 are secured to the respective mountings 82 of the engine 81. Firstly, with the end 12F of the first cylindrical member 12 of the mounting 10 set in contact with the end surface 82A of the mounting 82, a fastener 17 (first fastening member) having a shaft 17A formed with an external thread 17A1 is inserted through the mounting hole 12B of the first cylindrical member 12. Then the shaft 17A is screwed into the threaded hole 82B of the mounting 82, so that the first cylindrical member 12 is fastened to the mounting 82 by the fastener 17. In this way, the mounting 10 is secured to the mounting 82. The fastener 17 is made of a metal.

With the mounting 10 thus secured to the mounting 82, the mounting base 2B1 of the housing 2 is electrically connected through the metal film 11A and the first cylindrical member 12 to the mounting 82 or the engine 81. The ends 12F and 12G of the first cylindrical member 12 are in contact with the end surface 82A of the mounting 82 and the head 17B of the fastener 17, respectively. The compressive force of the fastener 17 is supported by the first cylindrical member 12 having higher compressive strength than the resin member 13, so that the resin member 13 is not subjected to such compressive force, which reduces fatigue and creep occurring the resin member 13.

While the compressor 101 is in operation, the compression mechanism 3 is operated in the housing 2 thereby to cause vibration of the housing 2.

The vibration of the housing 2 is transmitted through the mounting base 2B1 to the fastener 16, the metal film 11A, the second cylindrical member 142 and the resin member 13. The vibration transmitted directly to the resin member 13 is dampened because of high loss factor of the resin member 13. The vibration transmitted to the fastener 16 and the second cylindrical member 142 is transmitted to the resin member 13 around the second cylindrical member 142 and dampened there, which prevents vibration transmission from the fastener 16 and the second cylindrical member 142 to the first cylindrical member 12. The first cylindrical member 12 is not pressed directly against the mounting base 2B1, but the flexible metal film 11A is interposed between the first cylindrical member 12 and the mounting base 2B1. The vibration damping property of the resin member 13 having a wedge shaped portion between the first cylindrical member 12 and the mounting base 2B1 is less affected by the metal film 11A. The vibration transmitted to the metal film 11A is dampened by the resin member 13 and prevented from being transmitted to the first cylindrical member 12.

Vibration transmitted from the housing 2 to the resin member 13 is dampened, which prevents the vibration of the housing 2 from being transmitted to the first cylindrical member 12. Thus, the vibration of the housing 2 is prevented from being transmitted to the engine 81, resulting in reduced vibration transmission to a vehicle body (not shown) where the engine 81 is mounted. Further, the resin member 13 which is made of a resin material having a bending elastic modulus ranging from 100 to 10000 MPa has high rigidity and, therefore, the vibration of the housing 2 causes no deformation of the resin member 13. This prevents displacement of the housing 2 relative to the mounting 10 thereby to prevent the housing 2 from vibrating with a large amplitude.

Any electric charge generated in the housing 2 of the compressor body 1 flows through the mounting base 2B1 to the metal film 11A. The electric charge then flows through the first cylindrical member 12 and the fastener 17 to the mounting 82 or the engine 81 and further to a vehicle body (not shown) where the engine 81 is mounted. Any electric current caused by electrical leakage in the compressor body 1 flows to a vehicle body (not shown) through the metal film 11A, the first cylindrical member 12 and the fastener 17 serving as an earth.

As described above, the compressor 101 has the mounting 10 by which the compressor body 1 is fixed to the mounting 82 of the engine 81. The compressor body 1 is electrically powered to draw in fluid for compression and to discharge the compressed fluid. The mounting 10 includes the first cylindrical member 12 having the mounting hole 12B, the second cylindrical member 142 provided away from the first cylindrical member 12 and having the mounting hole 142B, and the resin member 13 formed integrally with the first and second cylindrical members 12 and 142. The first cylindrical member 12 is fastened to the mounting 82 by the fastener 17 inserted through the mounting hole 12B of the first cylindrical member 12. The second cylindrical member 142 is fastened to the compressor body 1 by the fastener 16 inserted through the mounting hole 142B of the second cylindrical member 142. The resin member 13 is provided at least between the first cylindrical member 12 and the compressor body 1.

The first cylindrical member 12 and the fastener 17 secured to the mounting 82 of the engine 81 is provided away from the second cylindrical member 142 and the fastener 16 secured to the compressor body 1, and the resin member 13 of high vibration damping property is provided at least between the first cylindrical member 12 and the compressor body 1. Vibration of the compressor body 1 is dampened by the resin member 13, which prevents the vibration from being transmitted to the first cylindrical member 12 and the mounting 82, resulting in reduced vibration transmission to the engine 81 and a vehicle body (not shown) where the engine 81 is mounted, thereby allowing reduction of resonance noise in a vehicle. Further, the first and second cylindrical members 12 and 142 which are integrated with the resin member 13 are firmly connected to each other, so that the compressor 101 is firmly secured to the mounting 82. Further, the compressive forces of the fasteners 17 and 16 are supported by the first and second cylindrical members 12 and 142, respectively, which reduces fatigue and creep occurring the resin member 13.

The compressor 101 has the flexible and electrically conductive metal film 11A coupled to the first cylindrical member 12 that is electrically conductive. The compressor body 1 and the mounting 82 are electrically connected through the metal film 11A and the first cylindrical member 12. The rigidity of the flexible metal film 11A is low, which prevents vibration transmission from the metal film 11A to the first cylindrical member 12. The metal film 11A and the first cylindrical member 12 providing electrical connection between the compressor body 1 and the mounting 82 serves to earth the compressor body 1. The vibration transmitted to the metal film 11A is dampened by the resin member 13 that is integrated with the metal film 11A and the first and second cylindrical members 12 and 142, which prevents vibration transmission from the metal film 11A to the first cylindrical member 12. The metal film 11A integrally formed with the first and second cylindrical members 12 and 142 by the resin member 13 facilitates earthing, resulting in a reduced manufacturing cost of the compressor.

The metal films 11A and 11B are in contact with the compressor body 1 and electrically connect the compressor body 1 and the first cylindrical member 12. Thus, the number of connections between the components in earthing between the compressor body 1 and the mounting 82 is reduced, resulting in reduction of contact failure due to damaged or deteriorated connection. The resin member 13 is made of a resin having a bending elastic modulus of not less than 100 MPa and not more than 10000 MPa, which provides the resin member 13 with high rigidity and prevents displacement of the compressor body 1 caused by vibration, thereby preventing the compressor body 1 from vibrating with a large amplitude.

Figure 5:
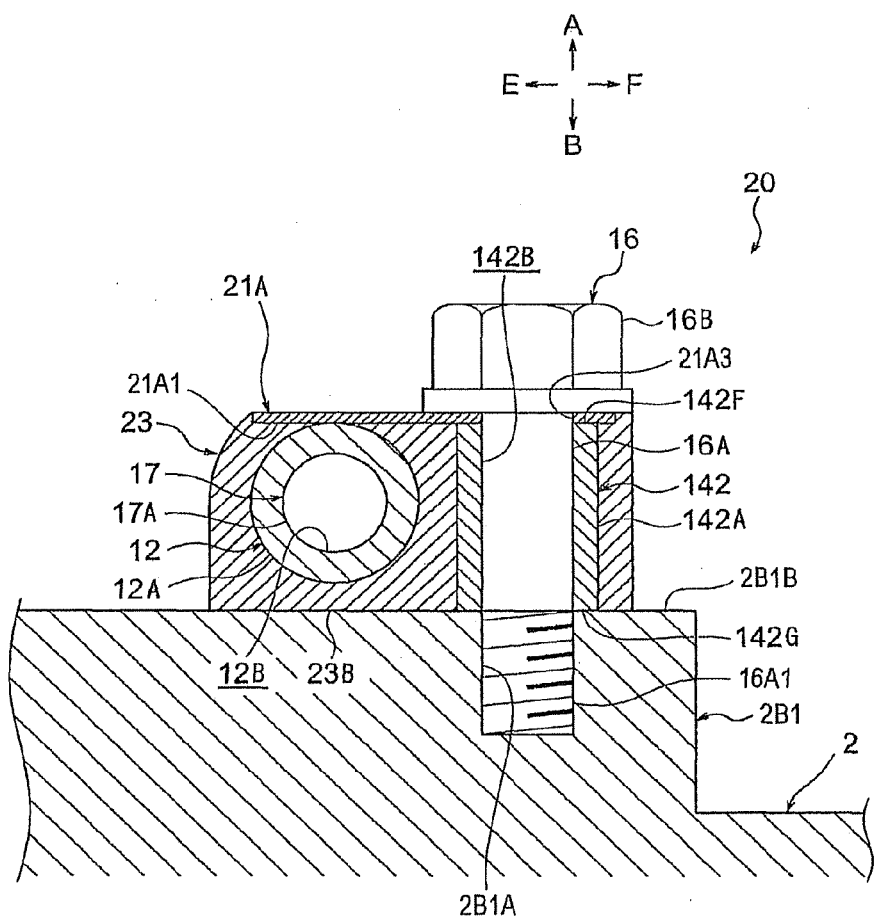
FIG. 5 is similar to FIG. 4, but showing a second embodiment of the mounting of the compressor.

FIG. 5 shows the second embodiment of the mounting of the compressor according to the present invention. The second embodiment differs from the first embodiment in that the metal film is in contact not with the lower end 142G of the second cylindrical member 142 but with the upper end 142F of the second cylindrical member 142. In the drawing, same reference numerals are used for the common elements or components in the first and second embodiments, and the description of such elements or components of the second embodiment will be omitted.

As shown in FIG. 5, the mounting 20 includes a metal film 21A (flexible conductive member) similar to the metal film 11A of the first embodiment and coupled at the lower surface 21A1 thereof to the top of the outer peripheral surface 12A of the first cylindrical member 12 and the upper end 142F of the second cylindrical member 142. The metal film 21A has a hole 21A3 formed therethrough and communicating with the mounting hole 142B of the second cylindrical member 142. The second cylindrical member 142 is made of a metal and electrically conductive. The resin member 23 is formed integrally with the first cylindrical member 12, the second cylindrical member 142 and the metal film 21A. The resin member 23 is formed around the outer peripheral surfaces 12A and 142A of the first and second cylindrical members 12 and 142.

With the mounting 20 secured to the mounting base 2B1 of the housing 2 by the fattener 16, the metal film 21A is interposed between the upper end 142F of the second cylindrical member 142 and the head 16B of the fastener 16, and the lower end 142G of the second cylindrical member 142 is in contact with the end surface 2B1B of the mounting base 2B1. The compressive force due to tightening of the fastener 16 is supported by the second cylindrical member 142, so that the resin member 23 is subjected to no such compressive force, which reduces fatigue and creep occurring in the resin member 23.

The resin member 23 is provided between the first cylindrical member 12 and the mounting base 2B1 and in contact at the lower surface 23B thereof with the end surface 2B1B of the mounting base 2B1. The mounting base 2B1 is electrically connected through the second cylindrical member 142 and the metal film 21A to the first cylindrical member 12. That is, the mounting base 2B1 is electrically connected to the engine 81 (see FIG. 1) through the second cylindrical member 142, the metal film 21A and the first cylindrical member 12.

The vibration of the housing 2 is transmitted through the mounting base 2B1 to the fastener 16, the second cylindrical member 142 and the resin member 23. The vibration transmitted to the fastener 16 and the second cylindrical member 142 is transmitted to the resin member 23 around the second cylindrical member 142 or transmitted through the metal film 21A to the resin member 23 integrated with the metal film 21A, and then dampened there. The vibration transmitted directly to the resin member 23 is dampened there. This prevents the vibration of the housing 2 from being transmitted to the first cylindrical member 12, resulting in reduced vibration transmission to the engine 81.

Any electric charge generated in the housing 2 of the compressor body 1 flows through the mounting base 2B1, the fastener 16 and the second cylindrical member 142 to the metal film 21A. The electric charge then flows through the first cylindrical member 12 and the fastener 17 to the engine 81 and further to a vehicle body (not shown) where the engine 81 is mounted. Any electric current caused by electrical leakage in the compressor body 1 flows through the fastener 16, the second cylindrical member 142, the metal film 21A, the first cylindrical member 12 and the fastener 17 serving as an earth.

The second embodiment offers the advantages similar to those of the first embodiment. The second cylindrical member 142 is electrically conductive. The metal film 21A is coupled to the second cylindrical member 142. The first cylindrical member 12, the metal film 21A and the second cylindrical member 142 electrically connect the compressor body 1 and the engine 81. Further, the metal film 21A is not in contact with the metal housing 2, which results in reduction of noise caused by the contact between the vibrating housing 2 and the metal, as compared to the first embodiment.

Figure 6:
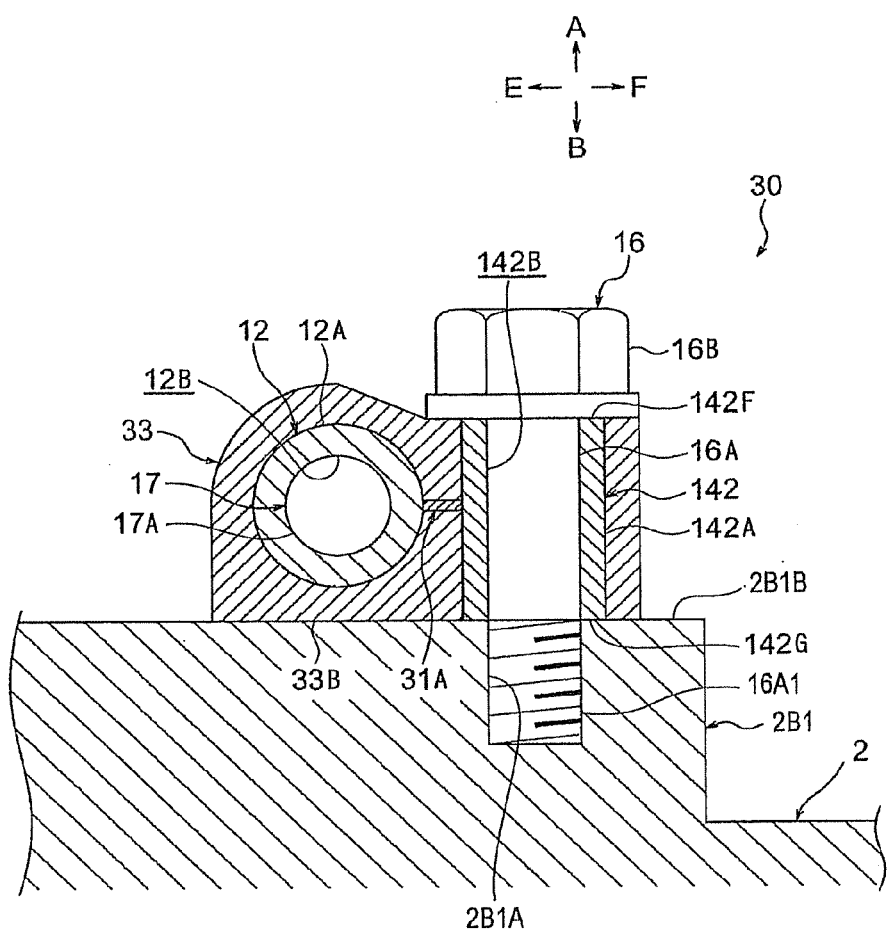
FIG. 6 is similar to FIG. 4, but showing a third embodiment of the mounting of the compressor.

FIG. 6 shows the third embodiment of the mounting of the compressor according to the present invention. The third embodiment differs from the first embodiment in that the mounting 30 includes a metal member 31A (flexible conductive member) that replaces the metal film 11A provided at the bottom of the resin member 13. In the drawing, same reference numerals are used for the common elements or components in the first and third embodiments, and the description of such elements or components of the third embodiment will be omitted.

As shown in FIG. 6, the metal member 31A, which is in the form of a line, fiber or rod, is provided within the resin member 33 and coupled to the outer peripheral surfaces 12A and 142A of the first and second cylindrical members 12 and 142. The metal member 31A is electrically conductive, flexible, and low in rigidity. The second cylindrical member 142 is made of a metal and electrically conductive. The resin member 33 is formed integrally with the first cylindrical member 12, the second cylindrical member 142 and the metal member 31A. The resin member 33 is formed around the outer peripheral surfaces 12A and 142A of the first and second cylindrical members 12 and 142 while embedding the metal member 31A therein.

With the mounting 30 secured to the mounting base 2B1 of the housing 2 by the fattener 16, the upper end 142F of the second cylindrical member 142 is in contact with the head 16B of the fastener 16, and the lower end 142G of the second cylindrical member 142 is in contact with the end surface 2B1B of the mounting base 2B1. The compressive force due to tightening of the fastener 16 is supported by the second cylindrical member 142, so that the resin member 33 is subjected to no such compressive force, which reduces fatigue and creep occurring in the resin member 33.

The resin member 33 is provided between the first cylindrical member 12 and the mounting base 2B1 and in contact at the lower surface 33B thereof with the end surface 2B1B of the mounting base 2B1. The mounting base 2B1 is electrically connected through the second cylindrical member 142 and the metal member 31A to the first cylindrical member 12. That is, the mounting base 2B1 is electrically connected to the engine 81 (see FIG. 1) through the second cylindrical member 142, the metal member 31A and the first cylindrical member 12.

The vibration of the housing 2 is transmitted through the mounting base 2B1 to the fastener 16, the second cylindrical member 142 and the resin member 33. The vibration transmitted to the fastener 16 and the second cylindrical member 142 is transmitted to the resin member 33 around the second cylindrical member 142 or transmitted through the metal member 31A to the resin member 33 integrated with the metal member 31A, and then dampened there. This prevents the vibration of the housing 2 from being transmitted to the first cylindrical member 12, resulting in reduced vibration transmission to the engine 81.

Any electric charge generated in the housing 2 of the compressor body 1 flows through the mounting base 2B1, the fastener 16 and the second cylindrical member 142 to the metal member 31A. The electric charge then flows through the first cylindrical member 12, and the fastener 17 to the engine 81 and further to a vehicle body (not shown) where the engine 81 is mounted. Any electric current caused by electrical leakage in the compressor body 1 flows through the fastener 16, the second cylindrical member 142, the metal member 31A, the first cylindrical member 12 and the fastener 17 serving as an earth.

The third embodiment offers the advantages similar to those of the first embodiment. The second cylindrical member 142 is electrically conductive. The metal member 31A is coupled to the second cylindrical member 142. The first cylindrical member 12, the metal member 31A and the second cylindrical member 142 electrically connect the compressor body 1 and the engine 81. Further, the metal member 31A is provided within the resin member 33 and not exposed to the outside. This prevents the metal member 31A from deteriorating due to rust or corrosion, resulting in an increased durability of the metal member 31A as the earth.

Figure 7:
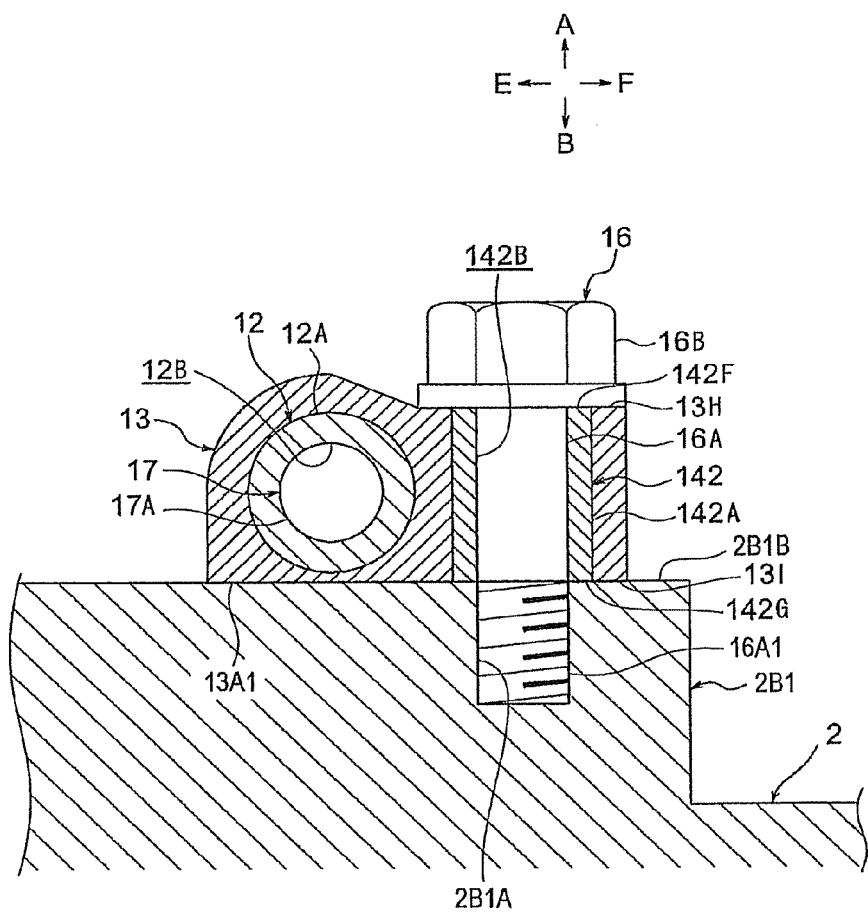
FIG. 7 is similar to FIG. 4, but showing still another embodiment of the mounting of the compressor.

Although in the first and second embodiments the metal films 11A, 11B and 21A in the form of a sheet are used for earthing the compressor 101, an electrically conductive member in the form of a line, fiber or rod may be used. For example, as shown in FIG. 7, the compressor body 1 and the engine 81 are electrically connected through an earth wire (not shown) without providing the metal film.

Although in the first and second embodiments the metal films 11A, 11B and 21A are formed integrally with the first and second cylindrical members 12 and 142 by the resin member 13 and 23, the metal films 11A, 11B and 21A may be provided separately from the first and second cylindrical members 12 and 142 and the resin members 13 and 23.

In the first and second embodiments, the resin member 13 may be fixed directly to the mounting base 2B1 of the housing 2 of the compressor body 1 by using the fastener 16 without providing the second and third cylindrical members 142 and 143. This results in reduction of cost associated with the second and third cylindrical members 142 and 143.

Although in the first, second and third embodiments the metal film 11A integrated with the resin member 13, the resin member 23 and the resin member 33, respectively, are in contact with the mounting base 2B1 of the housing 2 in the region below the first cylindrical member 12, they may be provided away from the mounting base 2B1. This reduces noise caused by the contact between the metal film 11A and the mounting base 2B1 and also between the resin members 23, 33 and the mounting base 2B1, thereby enhancing the vibration damping property of the resin members 13, 23, and 33.

Although in the previous embodiments the mountings 10, 20 and 30 are provided for the motor-driven compressor 101 mounted to the engine 81, such mountings may be provided for a motor-driven compressor to be mounted to an electric traction motor in a fuel cell vehicle or electric vehicle. The present invention may be applied not only to a refrigerant compressor for a refrigeration circuit but also to other motor-driven compressors such as an air compressor for a vehicle air suspension system or a pump for delivering hydrogen or air to a stack in a fuel cell vehicle.

What is claimed is:

1. A motor-driven compressor to be mounted to a first mounting of a vehicle, comprising:
a compressor body that is electrically powered to draw in fluid for compression and to discharge the compressed fluid; and
a second mounting for securing the compressor body to the first mounting, the second mounting comprising
a first mounting member having a first mounting hole and two ends;
a second mounting member having a second mounting hole and located near one of the two ends of the first mounting member and on a predetermined one side with respect to the first mounting member;
a third mounting member having a third mounting hole and located near the other one of the two ends of the first mounting member and on an opposite side of the second mounting member across the first mounting member;
a resin member integrally formed with the first and second mounting members and provided at least between the first mounting member and the compressor body;
a first fastening member inserted through the first mounting hole for securing the first mounting member to the first mounting;
a second fastening member inserted through the second mounting hole for securing the second mounting member to the compressor body; and
a third fastening member inserted through the third mounting hole for securing the third mounting member to the compressor body,
wherein the first mounting member and the second mounting member are provided separately from each other and fixed together by the resin member.

2. The motor-driven compressor according to claim 1, wherein the first and second mounting members are of a cylindrical shape and extending perpendicular to each other, the first mounting hole extends axially of the first mounting member, the second mounting hole extends axially of the second mounting member.

3. The motor-driven compressor according to claim 2, wherein the resin member is formed around outer peripheral surfaces of the first and second mounting members.

4. The motor-driven compressor according to claim 1, wherein the second mounting further comprises a flexible conductive member, wherein the first mounting member is electrically conductive and connected to the conductive member for electrical connection between the compressor body and the first mounting.

5. The motor-driven compressor according to claim 4, wherein the conductive member is in contact with the compressor body for electrical connection between the compressor body and the first mounting member.

6. The motor-driven compressor according to claim 4, wherein the second mounting member is electrically conductive and connected to the conductive member for electrical connection between the compressor body and the first mounting.

7. The motor-driven compressor according to claim 1, the material of the resin member has a bending elastic modulus of not less than 100 MPa and not more than 10000 MPa.

* * * * *